(12) United States Patent
Nicolas

(10) Patent No.: US 6,975,758 B2
(45) Date of Patent: Dec. 13, 2005

(54) IMAGE PROCESSING APPARATUS FOR AND METHOD OF IMPROVING AN IMAGE AND AN IMAGE DISPLAY APPARATUS COMPRISING THE IMAGE PROCESSING APPARATUS

(75) Inventor: Marina Marie Pierre Nicolas, Le Fontanil (FR)

(73) Assignee: Koninklijke Philips Electronics N.V., Eindhoven (NL)

(*) Notice: Subject to any disclaimer, the term of this patent is extended or adjusted under 35 U.S.C. 154(b) by 594 days.

(21) Appl. No.: 10/124,010

(22) Filed: Apr. 17, 2002

(65) Prior Publication Data
US 2002/0172417 A1    Nov. 21, 2002

(30) Foreign Application Priority Data
Apr. 20, 2001 (EP) .................................. 01201435

(51) Int. Cl.⁷ ............................................... G06K 9/00
(52) U.S. Cl. ................ 382/165; 382/164; 382/266; 382/170; 382/173; 358/518
(58) Field of Search ............... 382/164–168, 382/199, 274–276, 170–173, 260, 263, 266, 382/269, 224; 358/538

(56) References Cited

U.S. PATENT DOCUMENTS

| | | | |
|---|---|---|---|
| 5,173,769 A | * | 12/1992 | Hashimoto .................. 358/520 |
| 5,740,340 A | * | 4/1998 | Purcell et al. .............. 345/418 |
| 5,757,382 A | * | 5/1998 | Lee ............................ 345/441 |
| 5,848,181 A | | 12/1998 | Ogata |
| 6,707,943 B2 | * | 3/2004 | Gicquel et al. ............. 382/199 |
| 2004/0165773 A1 | * | 8/2004 | Katsuyama ................. 382/173 |

OTHER PUBLICATIONS

Chai et al, "Locating Facial Region of a Head-and-Shoulders Color Image", IEEE, Apr. 14, 1998, pp. 124–129.

* cited by examiner

Primary Examiner—Kanjibhai Patel
Assistant Examiner—Ali Bayat
(74) Attorney, Agent, or Firm—Larry Liberchuk

(57) ABSTRACT

An image processing apparatus (100) for improving images comprising a classification unit (102) for setting classification values to various regions of the images, and an improvement unit (104) for improving the image based on the classification values of the regions. The classification unit (102) takes into account only those pixels of the image that have a color value which is substantially equal to one of the color values from a predetermined range of color values. Based on these pixels the classification unit (102) determines whether the pixels belong to texture or to flat regions by comparing 2 histograms, one taking into account all the pixels with the color in the predetermined range of color values, the second one counting only these same pixels if their luminance value differs more than a given threshold form the luminance of their neighbor.

14 Claims, 3 Drawing Sheets

Figure 1:
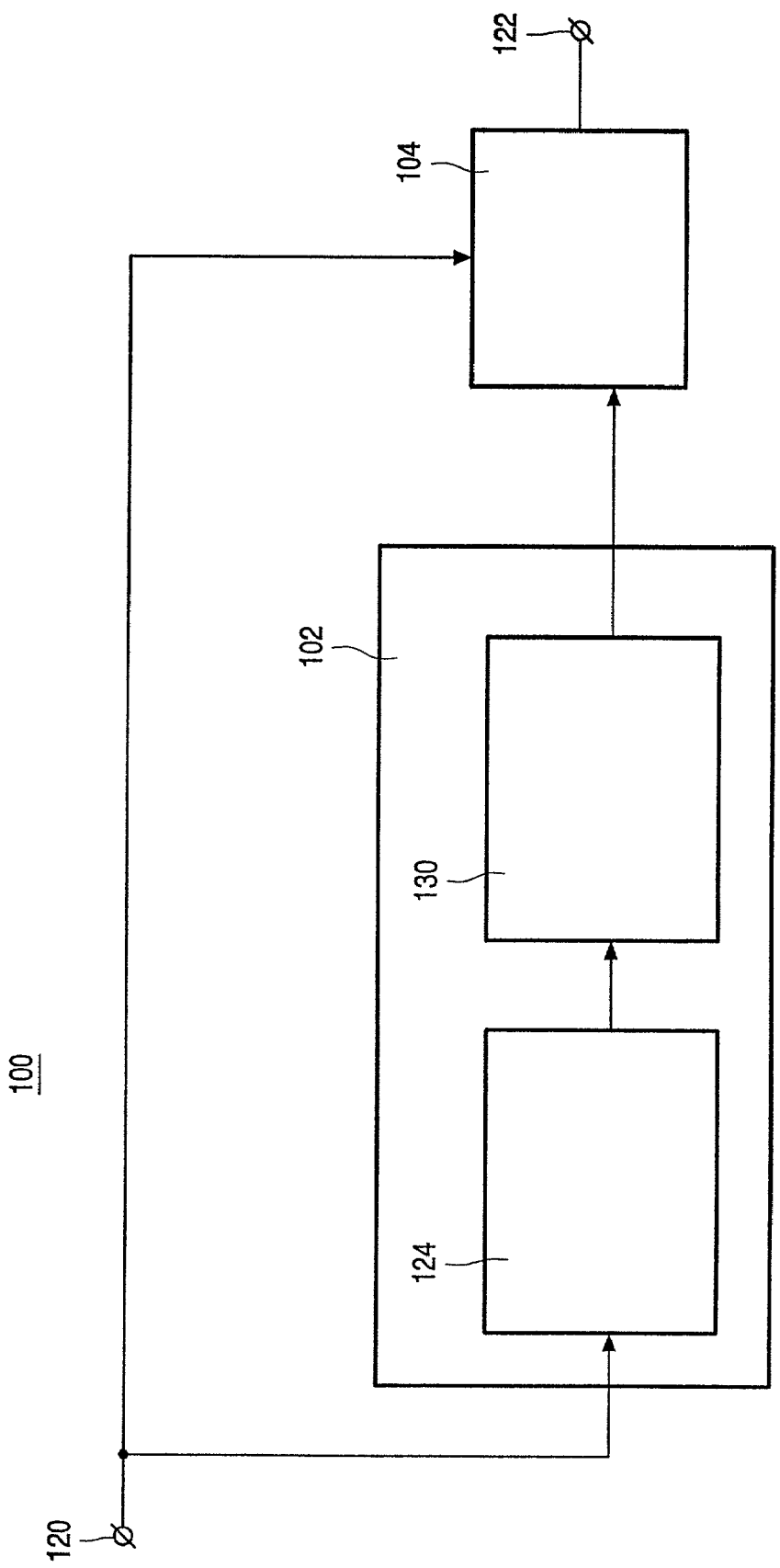

IMAGE PROCESSING APPARATUS FOR AND METHOD OF IMPROVING AN IMAGE AND AN IMAGE DISPLAY APPARATUS COMPRISING THE IMAGE PROCESSING APPARATUS

The invention relates to an image processing apparatus for improving an image, which image comprises a plurality of pixels, each having a luminance value, the image processing apparatus comprising:

a classification unit for setting a classification value to a particular pixel based on a difference between the luminance value of the particular pixel and the luminance value of a neighboring pixel of the particular pixel; and an improvement unit for improving the image by processing the particular pixel of the image based on the classification value of the particular pixel.

The invention further relates to an image display apparatus provided with:

receiving means for receiving a video signal representing images;

an image processing apparatus for improving an image, which image comprises a plurality of pixels, each having a luminance value, the image processing apparatus comprising:
  a classification unit for setting a classification value to a particular pixel based on a difference between the luminance value of the particular pixel and the luminance value of a neighboring pixel of the particular pixel;
  an improvement unit for improving the image by processing the particular pixel of the image based on the classification value of the particular pixel; and
  a display device for displaying the images.

The invention further relates to a method of improving an image, which image comprises a plurality of pixels, each having a luminance value, the method comprising:

a classification step to set a classification value to a particular pixel based on a difference between the luminance value of the particular pixel and the luminance value of a neighboring pixel of the particular pixel;

an improvement step to improve the image by processing the particular pixel of the image based on the classification value of the particular pixel.

An image processing apparatus and method of the kind described in the opening paragraph are known from U.S. Pat. No. 5,848,181.

A major shortcoming of many improvement units that are designed to improve images is that they operate globally. However the known apparatus provides location dependent image improvement, i.e. the known apparatus modulates the amount of noise reduction over the image. Below the importance of this local noise reduction is explained first. Then the principle of the known image processing apparatus is described. After that a major disadvantage of the known image processing apparatus is outlined.

Local noise reduction is important because many noise reduction units tend to remove details. Most of the time, the level of noise reduction required in flat, low detailed, regions is too high for detailed regions of the same image. Such a high level of noise reduction suitable for flat regions might result in loss of information in those detailed regions. It might also lead to images looking unnatural. There is no reason why the amount of white noise would differ from one region of the image to the other. A region is a group of connected pixels. However, the same amount of noise is more or less visible in different regions of the image. A possible solution is to modulate the amount of noise reduction over the image: a relatively high noise reduction in some regions and a lower noise reduction in other regions. In order to achieve this, a kind of segmentation or classification is required to divide an image into regions which are relatively flat respectively into regions which are more crispy. In the known image processing apparatus the segmentation of the image into regions is based on differences in luminance values of neighboring pixels. Differences in luminance values are related to the spectrum of frequency components of the image but have no direct relation with the visual contents of the image. Hence differences in luminance values are not good enough to identify noise in the image. The result is that the known image processing apparatus will classify objects in the image having a texture with relatively high frequency components as noise. Filtering these objects, as noise reduction is, may result in loss of information.

It is a first object of the invention to provide an image processing apparatus of the kind described in the opening paragraph which is able to discriminate between noise and texture.

It is a second object of the invention to provide an image display apparatus of the kind described in the opening paragraph comprising an image processing apparatus which is able to discriminate between noise and texture.

It is a third object of the invention to provide a method of the kind described in the opening paragraph that discriminates between noise and texture.

The first object of the invention is achieved in that the classification unit is designed to set the classification value by taking into account that a first color value of the particular pixel is substantially equal to a second color value of a predetermined range of color values. Incorporating an extra discriminator in the classification leads to an improved segmentation of the image into regions. With the following example this will be explained. Suppose that the classification for each of the discriminators, i.e. frequency component and color is binary. Then four types of region can be identified. Regions for which there are:

relatively large differences of luminance values between neighboring pixels and the color values of the pixels are substantially equal to one of the values from a predetermined range of color values;

relatively large differences of luminance values between neighboring pixels but the color values of the pixels are not equal to one of the values from a predetermined range of color values;

relatively small differences of luminance values between neighboring pixels and the color values of the pixels are substantially equal to one of the values from a predetermined range of color values;

relatively small differences of luminance values between neighboring pixels but the color values of the pixels are not equal to one of the values from a predetermined range of color values.

The assumption is that the first type of region correspond to texture regions, corresponding to relevant objects being imaged, while the other types of region do not. The various types of region must be handled differently. For a non-binary classification the same holds. The improved segmentation enables to modulate the amount of image improvement more dedicated to the type of scene that has been captured in the images. It will be clear that it is required to handle flat areas and texture differently: e.g. noise must be reduced sufficiently in flat areas while texture must be preserved or even enhanced whenever possible.

In an embodiment of the image processing apparatus according to the invention the improvement unit is a noise reduction unit. The rational for regional noise reduction is explained above. Segmentation enables to modulate the amount of noise reduction over regions of the image. Several types of noise reduction can be realized: e.g. spatial, temporal and spatio-temporal. For a temporal or spatio-temporal noise reduction a sequence of images is required. For both the classification and the noise reduction it is possible to use more than one image.

In an embodiment of the image processing apparatus according to the invention the improvement unit is an edge-enhancement unit to enhance details in the image. Details may be edges or textures.

In an embodiment of the image processing apparatus according to the invention the predetermined range of color values covers colors of grass. Knowledge of the scene which has been imaged, makes it possible to extract describing parameters. In the case that it is known that e.g. a football match has been imaged, then it is quite certain that grass will be visible in the images. Because the predetermined range of color values of the image processing apparatus can correspond to the colors of grass this embodiment according to the invention can be tuned to specific types of scenes. Embodiments with another predetermined range of color values can be tuned to other specific types of scenes, e.g. blue sky, blue water, brown sand, white snow or flesh-tone for human skin.

An embodiment of the image processing apparatus according to the invention designed to reduce noise, comprises:

a color masking means for dividing the pixels of the image in a first set of pixels that have the first color value which is substantially equal to the second color value of the predetermined range of color values and a second set of pixels that have a third color value which is different to each of the color values of the predetermined range of color values;

a first histogram generating means for generating a first histogram of luminance values of the pixels of the first set of pixels;

a second histogram generating means for generating a second histogram of luminance values of the pixels of the first set of pixels, provided that a difference between a luminance value of a selected pixel and a luminance value of a neighboring pixel of the selected pixel is higher than a predetermined threshold; and an analyzer designed to analyze the first histogram and the second histogram in order to set a classification value to the pixels of the image.

Only pixels of the first set of pixels are used to generate the first and the second histogram. It is assumed that based on their color, these pixels are located in regions which might correspond to relevant objects of the scene. Whether these objects as imaged have texture or have a flat surface is determined by comparing the first and the second histogram. Basically the main difference between the first histogram and the second histogram is that in the second histogram only pixels from crispy regions are taken into account, i.e. pixels from flat regions are not taken into account. The classification of the regions is done by comparing the first and the second histogram. The following classification criterion is leading:

If the second histogram is much lower than the first histogram, then the pixels of the first set are located in flat regions;

If the second histogram is substantially equal with the first histogram, then the pixels of the first set are located in texture regions.

The classification criterion is tuned by analyzing the properties of the first histogram. In other words the classification into flat or texture is controlled by inspecting the first histogram. The amount of allowed difference between the first and second histogram depends on the properties of the first histogram:

If the first histogram is relatively narrow and symmetrical, then the probability that the pixels of the first set correspond to texture is relatively high. Then the allowed difference is relatively high;

If the first histogram is relatively spread over a large range of luminance values or is unsymmetrical, then the probability that the pixels of the first set correspond to texture is relatively low. Then the allowed difference is relatively low.

After having analyzed and compared the first and the second histogram the analyzer classifies the pixels. This classification resembles the probability that, for the pixels of the image having a color value which is substantially equal to one of the color values from a predetermined range of color values, the corresponding luminance level corresponds to texture. In other words, all pixels of the first set having mutual equal luminance values have the same classification value. Hence the pixels can be classified by means of their luminance values. Individually addressing of the pixels in order to process them is not required.

In an embodiment of the image processing apparatus according to the invention the analyzer is designed to set the classification value for the pixels individually. If the spatial position of the pixels is known, then it is possible to classify the probability per pixel. An advantage of this embodiment is that accurate identification of pixel is possible, which is beneficial in the improvement unit.

In an embodiment of the image processing apparatus according to the invention the first histogram and the second histogram are weighted histograms. In a regular histogram all elements count for one. In the case that a regular histograms had been used then e.g. the first histogram should have hold for each luminance value the number of pixels having that value. However in this embodiment the pixels have a weight which is related to the color value of the pixel. This weight determines how many times the particular pixel must be counted. For example, for a pixel with a color value which is substantially equal to a color at the border of the predetermined range of color values the weight is relatively low. At the other hand, for a pixel with the color value which is substantially equal to the color at the center of the predetermined range of color values the weight is relatively high. The advantage of this embodiment is that the classification is automatically somewhat fuzzy, preventing annoying switching at the border of the range.

An embodiment of the image processing apparatus according to the invention designed to reduce noise, comprises:

a noise estimator designed to estimate a noise level of the image and designed to provide input for;

a control unit connected to the second histogram generating means and designed to control the predetermined threshold based on the noise level; and the improvement unit being arranged to reduce noise in the image in dependence of the classification value of the pixels.

An essential aspect of this embodiment is the control of the predetermined threshold. This control is based on an estimated noise level. If the estimated noise level is relatively high then the predetermined threshold is also relatively high. Many noise estimators are designed to estimate noise by gathering information about luminance differences of neighboring pixels: count the number of pixels with a luminance value which differs more than a noise threshold from its neighboring pixel. This is essentially the same principle as is used by the classification unit. In such a case the level of the noise threshold of the noise estimator determines the level of the predetermined threshold of the classification unit. E.g. the level of the predetermined threshold of the classification unit is set higher than the level of the noise threshold of the noise estimator. The result is that the differences in luminance values of pixels due to details in texture are taken into account, while the differences due to noise are left out. The advantage of this embodiment is that the image processing apparatus keeps working properly under various conditions.

The second object of the invention is achieved in that the image display apparatus comprises an image processing apparatus with a classification unit that is designed to set the classification value by taking into account that a first color value of the particular pixel is substantially equal to a second color value of a predetermined range of color values.

The third object of the invention is achieved in that in the classification step the classification value is set by taking into account that a first color value of the particular pixel is substantially equal to a second color value of a predetermined range of color values.

Figure 2:
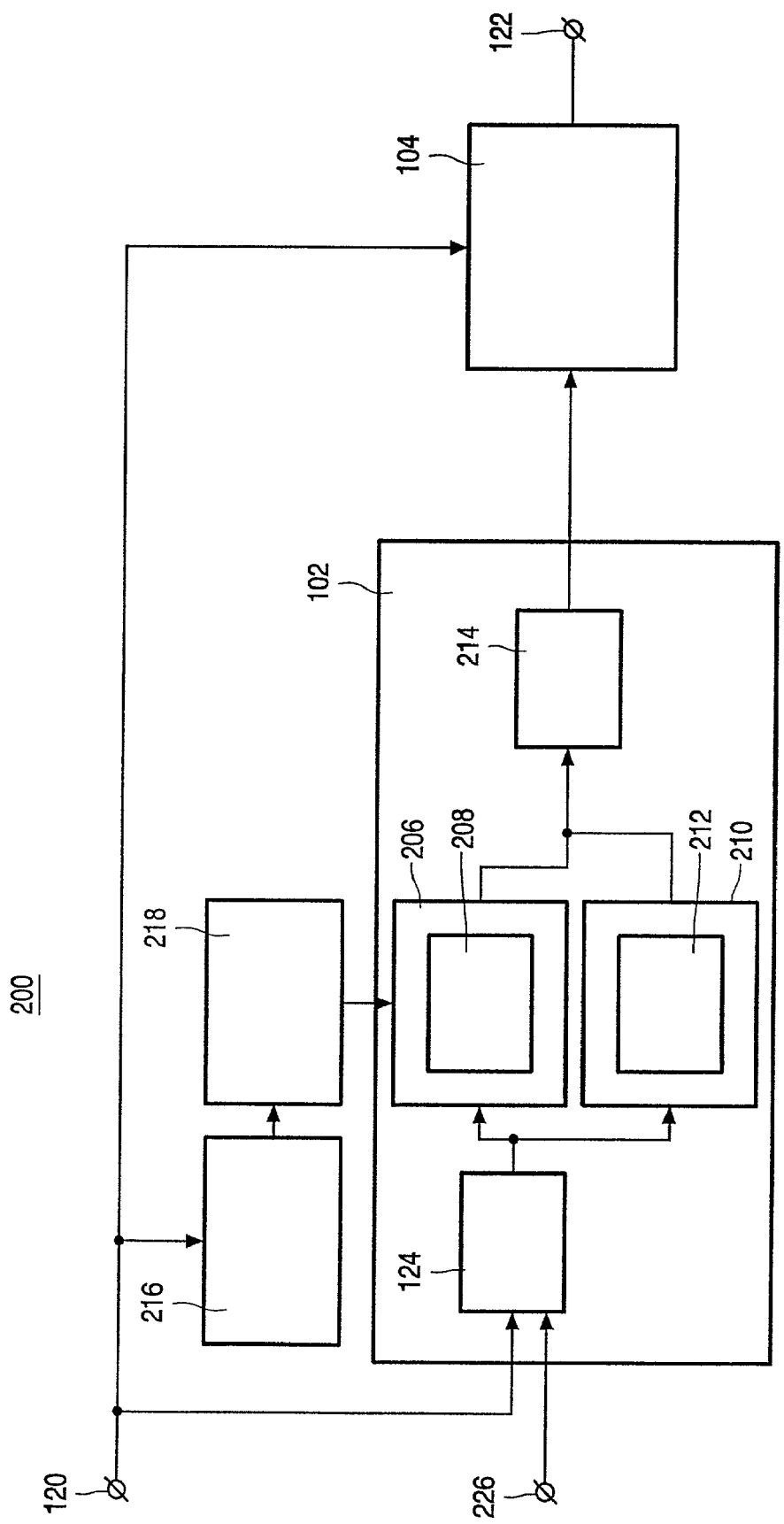
Figure 3:
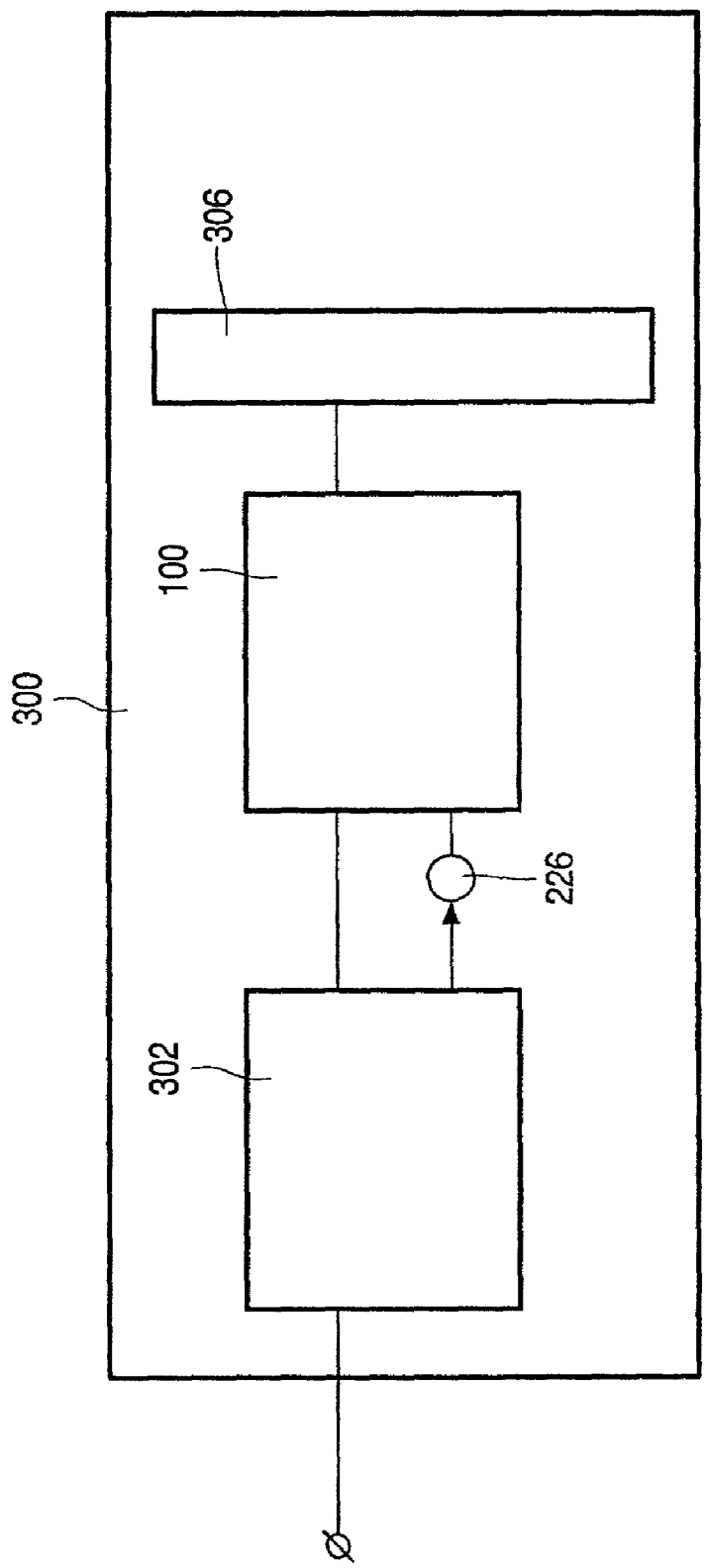

These and other aspects of the image processing apparatus, the method of improving an image and of the image display apparatus according to the invention will become apparent from and will be elucidated with reference with respect to the implementations and embodiments described hereinafter and with reference to the accompanying drawings, wherein:

FIG. 1 schematically shows a first embodiment of the image processing apparatus;

FIG. 2 schematically shows a second embodiment of the image processing apparatus; and FIG. 3 schematically shows elements of the image display apparatus.

FIG. 1 schematically shows a first embodiment of an image processing apparatus 100 for local optimization of images with grass. The image processing apparatus 100 is designed to reduce noise in images, while preserving the texture of grass. The video signal that represents images of which noise must be reduced enters the image processing apparatus 100 at the input connector 120. After being corrected, i.e. noise reduction applied, the video signal is provided at the output connector 122. The image processing apparatus 100 comprises:

a classification unit 102 designed to set classification values to various regions of the images. The classification unit 102 comprises:

a color masking means 124 for dividing the pixels of the image in a first set of pixels that have a first color value which is substantially equal to a second color value of a predetermined range of color values and a second set of pixels that have a third color value which is different to each of the color values of the predetermined range of color values.

a differentiator 130 designed to determine the difference in luminance values of neighboring pixels of the first set of pixels in order to set a classification value to the pixels of the images; and an improvement unit 104 arranged to reduce noise controlled by the classification unit 102 by means of the classification values.

The behavior of the image processing apparatus 100 will be explained below. The pixels of the images are divided into two sets: one set from which it is assumed that its pixels might correspond to grass and a second set of pixels for which it is assumed that they do not correspond to grass. These sets are created by performing two tests: first the color value of each pixel is compared with a range of color values that covers colors of grass, then the differences in luminance values of neighboring pixels are compared with a preselected range. Based on these tests the pixels of the image are classified. This is done by setting to each pixel a classification value, i.e. a probability of being grass, depending on the color value and the difference in luminance value of the pixel relative to a neighboring pixel. Because luminance and color tend to change gradually over the images the probability that groups of connected pixels are classified substantially equal is relatively big. Hence regions of images are classified as being grass or no grass. The improvement unit 104 arranged to reduce noise is modulated by these classification values. The result is that the texture of grass is preserved while noise in noisy regions, not being grass, is reduced.

FIG. 2 schematically shows a second embodiment of an image processing apparatus 200 for local optimization of images with grass. The image processing apparatus 200 is designed to reduce noise in images, while preserving the texture of grass. The video signal that represents images of which noise must be reduced enters the image processing apparatus 100 at the input connector 120. After being corrected, i.e. noise reduction applied, the video signal is provided at the output connector 122. The image processing apparatus 200 comprises:

a classification unit 102 designed to set classification values to various regions of the images. The classification unit 102 comprises:

a color masking means 124 for dividing the pixels of the image in a first set of pixels that have a first color value which is substantially equal to a second color value of a predetermined range of color values and a second set of pixels that have a third color value which is different to each of the color values of the predetermined range of color values. This predetermined range of color values can be adjusted by means of the control input 226;

a first histogram generating means 210 for generating a first histogram 212 of luminance values of the pixels of the first set of pixels;

a second histogram generating means 206 for generating a second histogram 208 of luminance values of the pixels of the first set of pixels provided that the difference between the luminance value of a selected pixel and the luminance value of a neighboring pixel of the selected pixel is higher than a predetermined threshold;

an analyzer 214 designed to analyze the first histogram and the second histogram in order to set a classification value to the pixels of the images;

an improvement unit 104 arranged to reduce noise controlled by the classification unit 102 by means of the classification values;

a noise estimator 216 designed to estimate a noise level of the images and designed to provide input for;

a control unit 218 connected to the second histogram generating means 206 and designed to control the predetermined threshold based on the noise level.

The behavior of the image processing apparatus 200 will be explained below. From incoming images a noise level is estimated. Further the pixels of the images are divided into two sets: one set from which it is assumed that these pixels might correspond to grass based on the color value and a second set of pixels for which it is assumed that they do not correspond to grass. From the first set of pixels two histograms are made. The first histogram represents the numbers of pixels as function of luminance value. The second histogram represents the numbers of pixels as function of luminance but takes into account only the pixels with a luminance value that differs enough from the one of their neighbor. These two histograms are analyzed in order to classify pixels of the images. This is done by setting to each pixel a classification value, i.e. a probability of being grass, depending on the color value and the luminance value of the pixel. Because luminance and color tend to change gradually over the images the probability that groups of connected pixels are classified substantially equal is relatively big. Hence regions of images are classified as being grass or no grass. The improvement unit 104 arranged to reduce noise is modulated by these classification values. The result is that the texture of grass is preserved while noise in noisy regions, not being grass, is reduced.

FIG. 3 shows elements of an image display apparatus 300 according to the invention. The image display apparatus 300 has a receiving means 302 for receiving a video signal representing the images to be displayed. The signal may be a broadcast signal received via an antenna or cable but may also be a signal from a storage device like a VCR (Video Cassette Recorder) or DVD (Digital Versatile Disk). The image display apparatus 300 further has an image processing apparatus 100 for processing the video signal and a display device 306 for displaying the images represented by the improved video signal. The image processing apparatus 100 is implemented as described in FIG. 1 or FIG. 2. The image processing apparatus 100 can be controlled externally. The predetermined range of color values can be adjusted by means of the control input 226. The receiving means 302 can get notified or has capabilities to extract information from the video signal about the type of scene that has been imaged in order to set the appropriate range of color values of the image display apparatus 300. E.g. in the case of a football match the predetermined range of colors should match the colors of grass.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

What is claimed is:

1. An image processing apparatus (100) for improving an image, which image comprises a plurality of pixels, each having a luminance value, the image processing apparatus comprising:

a classification unit (102) for setting a classification value to a particular pixel based on a difference between the luminance value of the particular pixel and the luminance value of a neighboring pixel of the particular pixel; and an improvement unit (104) for improving the image by processing the particular pixel of the image based on the classification value of the particular pixel, characterized in that the classification unit (102) is designed to set the classification value by taking into account that a first color value of the particular pixel is substantially equal to a second color value of a predetermined range of color values.

2. An image processing apparatus (100) as claimed in claim 1, characterized in that the improvement unit (104) is a noise reduction unit.

3. An image processing apparatus (100) as claimed in claim 1, characterized in that the improvement unit (104) is an edge-enhancement unit.

4. An image processing apparatus (100) as claimed in claim 2, characterized in that the predetermined range of color values covers colors of grass.

5. An image processing apparatus (100) as claimed in claim 1, characterized in that the classification unit (102) comprises:

a color masking means (124) for dividing the pixels of the image in a first set of pixels that have the first color value which is substantially equal to the second color value of the predetermined range of color values and a second set of pixels that have a third color value which is different to each of the color values of the predetermined range of color values;

a first histogram generating means (210) for generating a first histogram (212) of luminance values of the pixels of the first set of pixels;

a second histogram generating means (206) for generating a second histogram (208) of luminance values of the pixels of the first set of pixels, provided that a difference between a luminance value of a selected pixel and a luminance value of a neighboring pixel of the selected pixel is higher than a predetermined threshold; and an analyzer (214) designed to analyze the first histogram (212) and the second histogram (208) in order to set the classification value of the pixels of the image.

6. An image processing apparatus (100) as claimed in claim 5, characterized in that the analyzer (214) is designed to set the classification value of the pixels individually.

7. An image processing apparatus (100) as claimed in claim 5, characterized in that the first histogram (212) and the second histogram (208) are weighted histograms.

8. An image processing apparatus (100) as claimed in claim 5, characterized in comprising:

a noise estimator (216) designed to estimate a noise level of the image and designed to provide input for;

a control unit (218) connected to the second histogram generating means (206) and designed to control the predetermined threshold based on the noise level, and the improvement unit (104) being arranged to reduce noise in the image in dependence of the classification value of the pixels.

9. An image display apparatus (300) provided with:

receiving means (302) for receiving a video signal representing images;

an image processing apparatus (100) for improving an image, which image comprises a plurality of pixels, each having a luminance value, the image processing apparatus comprising:

a classification unit (102) for setting a classification value to a particular pixel based on a difference between the luminance value of the particular pixel and the luminance value of a neighboring pixel of the particular pixel;

an improvement unit (104) for improving the image by processing the particular pixel of the image based on the classification value of the particular pixel;

a display device (306) for displaying the images, characterized in that the classification unit (102) is designed to set the classification value by taking into account that a first color value of the particular pixel is substantially equal to a second color value of a predetermined range of color values.

10. An image display apparatus (300) as claimed in claim 9, characterized in that the classification unit (102) comprises:

a color masking means (124) for dividing the pixels of the image in a first set of pixels that have the first color value which is substantially equal to the second color value of the predetermined range of color values and a second set of pixels that have a third color value which is different to each of the color values of the predetermined range of color values;

a first histogram generating means (210) for generating a first histogram (212) of luminance values of the pixels of the first set of pixels;

a second histogram generating means (206) for generating a second histogram (208) of luminance values of the pixels of the first set of pixels, provided that a difference between a luminance value of a selected pixel and a luminance value of a neighboring pixel of the selected pixel is higher than a predetermined threshold; and an analyzer (214) designed to analyze the first histogram (212) and the second histogram (208) in order to set the classification value of the pixels of the image.

11. An image display apparatus (300) as claimed in claim 10, characterized in that the analyzer (214) is designed to set the classification value the each of the pixels individually.

12. An image display apparatus (300) as claimed in claim 10, characterized in that the first histogram (212) and the second histogram (208) are weighted histograms.

13. An image display apparatus (300) as claimed in claim 10, characterized in comprising:

a noise estimator (216) designed to estimate a noise level of the image and designed to provide input for;

a control unit (218) connected to the second histogram generating means (206) and designed to control the predetermined threshold based on the noise level, and the improvement unit (104) being arranged to reduce noise in the image in dependence of the classification value of the pixels.

14. A method of improving an image, which image comprises a plurality of pixels, each having a luminance value, the method comprising:

a classification step to set a classification value to a particular pixel based on a difference between the luminance value of the particular pixel and the luminance value of a neighboring pixel of the pixel; and an improvement step to improve the image by processing the particular pixel of the image based on the classification value of the particular pixel, characterized in that in the classification step the classification value is set by taking into account that a first color value of the particular pixel is substantially equal to a second color value of a predetermined range of color values.

* * * * *